United States Patent
Watkins

(10) Patent No.: US 9,246,762 B1
(45) Date of Patent: Jan. 26, 2016

(54) NTP CLIENT-SIDE AUTOMATIC CONFIGURATION

(71) Applicant: Amazon Technologies, Inc., Reno, NV (US)

(72) Inventor: Jared Todd Watkins, Shoreline, WA (US)

(73) Assignee: Amazon Technologies, Inc., Reno, NV (US)

( * ) Notice: Subject to any disclaimer, the term of this patent is extended or adjusted under 35 U.S.C. 154(b) by 37 days.

(21) Appl. No.: 14/309,649

(22) Filed: Jun. 19, 2014

(51) Int. Cl.
*H04L 12/28* (2006.01)
*H04J 3/06* (2006.01)
*H04L 12/24* (2006.01)
*H04L 12/751* (2013.01)
*H04W 56/00* (2009.01)

(52) U.S. Cl.
CPC ........ *H04L 41/0886* (2013.01); *H04L 41/0893* (2013.01); *H04L 45/02* (2013.01); *H04W 56/001* (2013.01)

(58) Field of Classification Search
USPC ........................ 370/254–255, 350, 503–523
See application file for complete search history.

(56) References Cited

U.S. PATENT DOCUMENTS

| | | | | |
|---|---|---|---|---|
| 8,774,230 B2* | 7/2014 | Gheorghiu | ........ | H04W 56/0015 370/350 |
| 2003/0097564 A1* | 5/2003 | Tewari | ........ | H04L 12/14 713/171 |
| 2008/0101277 A1* | 5/2008 | Taylor | ........ | G01S 5/0289 370/328 |
| 2008/0212617 A1* | 9/2008 | Flesch | ........ | G10H 1/0058 370/503 |
| 2009/0238214 A1* | 9/2009 | Hong | ........ | H04J 3/0688 370/503 |
| 2010/0014460 A1* | 1/2010 | Shin | ........ | H04J 3/0679 370/328 |
| 2013/0120105 A1* | 5/2013 | Bhageria | ........ | G05B 23/0264 340/3.1 |

OTHER PUBLICATIONS

Wikipedia, "Network Time Protocol," <http://en.wikipedia.org/wiki/Network_time_protocol>, 9 pages (accessed Jun. 16, 2014).
Wikipedia, "Domain Name System," <http://en.wikipedia.org/wiki/Dns>, 15 pages (accessed Jun. 16, 2014).

* cited by examiner

*Primary Examiner* — Candal Elpenord
(74) *Attorney, Agent, or Firm* — Klarquist Sparkman, LLP

(57) ABSTRACT

Techniques and solutions for performing automatic client-side configuration of network services is described. For example, a host can determine a location where the host is located. The host can obtain a list of locations containing providers of the network service. The host can obtain network service providers based on the list. For example, the host can first obtain providers from the same location and then from other locations as needed. In some implementations, the domain name system (DNS) is used to lookup available providers of the network service. For example, the DNS system can be used to provide information about available providers that is specific to the location of the host running the network service client and/or based on other criteria (e.g., based on a type of network, such as a network fabric, associated with the host).

19 Claims, 8 Drawing Sheets

NTP CLIENT-SIDE AUTOMATIC CONFIGURATION

BACKGROUND

Networks, such as public and/or private networks, can be large and complicated. For example, the network architecture of a large company may span many locations, such as data centers, cities, states, countries, and continents. Furthermore, the network architecture of a large company may be divided into a variety of different structures, each of which may provide different services external and/or internal to the company.

Configuring network services to operate efficiently within such a network can be a difficult task. In some solutions, network services are configured statically (e.g., using a static configuration file). While use of a static configuration may be appropriate in some situations, it can also result in inefficient configuration of network service clients. For example, a client in a particular network location may be configured to communicate with servers in a different location (e.g., a location that is not in close network proximity to the client) even though there are servers which are closer network-wise, which can result in increased network traffic and reduced performance of the network service.

DETAILED DESCRIPTION

Overview

Figure 1:
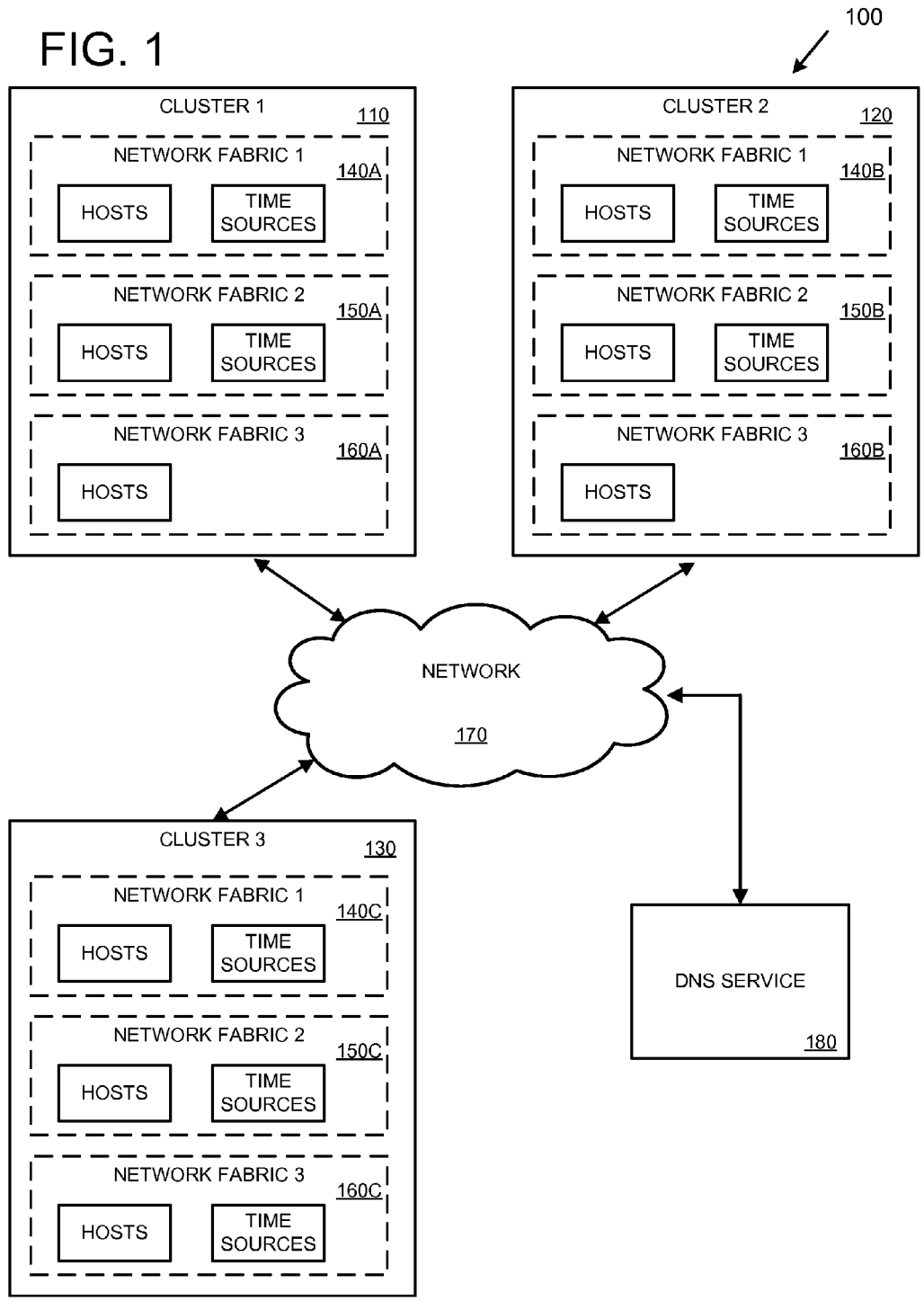
FIG. 1 is a diagram of an example environment supporting automatic configuration of network time protocol (NTP) clients.

The following description is directed to techniques and solutions for automatically configuring network service clients. For example, the technologies described herein can be applied to automatically determine which provider (or providers) of a network service should be used (e.g., used by a computing device running a client of the network service). In some implementations, the domain name system (DNS) is used to lookup available providers of the network service. For example, the DNS system can be used to provide information about available providers that is specific to the location of the computing device running the network service client and/or based on other criteria (e.g., based on a type of network, such as a network fabric, associated with the computing device).

For example, a computing device can automatically configure a network service (e.g., configure a network service client running on the computing device) by determining a location of the computing device (e.g., a cluster or another type of location such as a geographical region), determining locations that include at least one server providing the network service, and configuring the network service to use one or more of the servers located in one or more of the locations. In some implementations, a number of servers are obtained (e.g., a pre-determined number) based on the location where the computing device is located. For example, servers providing the network service that are in the same location as the computing device can be preferred (e.g., selected first). Servers providing the network service that are in other locations can be selected when there are not enough servers in the same location. For example, the computing device can determine how close the other locations are (e.g., in terms of network latency). The computing device can prefer servers in locations with lower latency over servers in locations with higher latency (e.g., select servers in order of location latency).

In some implementations, the technologies described herein can be applied to automatically configure the network time protocol (NTP) service (e.g., to determine which NTP servers, also called stratum time sources, to use to configure an NTP client). For example, automatic NTP client-side configuration can be performed by obtaining a list of clusters that provide stratum time sources (e.g., a list provided as a DNS text record). Based on the list, a computing device running an NTP client can obtain stratum time sources to configure the NTP client. For example, the computing device can determine a cluster where the computing device is located. The computing device can then obtain a number of stratum time sources (e.g., obtain addresses, such as Internet protocol (IP) addresses, of the stratum time sources) based on the location. For example, if the computing device is in a cluster where stratum time sources are located, the stratum time sources in the cluster can be obtained first (e.g., from a DNS round-robin (RR) record associated with the cluster). If additional stratum time sources are needed (e.g., if the cluster where the computing device is located does not contain stratum time sources or there are not enough), stratum time sources can be obtained from other clusters in the list. For example, the computing device can prefer stratum time sources in locations with lower latency over stratum time sources in locations with higher latency (e.g., select stratum time sources in order of location latency).

In some implementations, the technologies described herein can be applied to automatically configure the network time protocol (NTP) service based on the cluster where the computing device running the NTP client is located and also based on the network fabric associated with the computing device (e.g., the network fabric where the computing device is connected). For example, a list of clusters that is associated with the network fabric can be obtained. Each cluster in the list can contain at least one stratum time source (e.g., associated with the network fabric within the cluster). The computing device can then obtain a number of stratum time sources (e.g., obtain addresses, such as Internet protocol (IP) addresses, of the stratum time sources) based on the location. For example, if the computing device is in a cluster where stratum time sources are located, the stratum time sources in the cluster can be obtained first. If additional stratum time sources are needed (e.g., if the cluster where the computing device is located does not contain stratum time sources or there are not enough), stratum time sources can be obtained from other clusters in the list. For example, the computing device can prefer stratum time sources in locations with lower latency over stratum time sources in locations with higher latency (e.g., select stratum time sources in order of location latency).

The technologies described herein for automatic client-side configuring network services can provide advantages in various situations. For example, a client of the network service can be automatically configured to use servers based on criteria such as region, cluster, network fabric, latency, bandwidth, and/or based on other criteria. For example, the DNS system can be used to provide specific locations where network service providers are located and to provide network service provider addresses. Computing devices running network clients can then automatically configure the network clients to use network service providers that are in close network proximity, which can result in reduced network traffic (e.g., network traffic external to a local geographical area) and improved network service performance (e.g., due to network connections that use fewer hops, have lower latency, and/or have increased reliability or consistency).

The various technologies described herein can be implemented by a variety of hosts that operate clients of a network service (e.g., via a network client implemented in software and/or hardware of the host). For example, a host can include any type of computing device that operates a client of a network service (e.g., a server computer such as a file server, database server, storage server, web server, a desktop computer, laptop, networking device, or another type of computing device).

Network Services

In the technologies described herein, a network service refers to a service provided via a network (e.g., a private network and/or a public network, such as the Internet) in which a client of the network service is configured to use a number of network service providers. The providers of the network service (e.g., server computers that operate as network service providers) may be located in different geographical areas (e.g., regions or clusters) and may be connected to a variety of networks (e.g., different network fabrics).

The technologies described herein can be applied to configure clients of network services including instant messaging services, web services, content distribution services, NTP, and/or other types of network services where network clients are configured to communicate with a number of servers based on criteria such as client location, network latency, etc.

Network Time Protocol (NTP)

The technologies described herein can be applied to automatically configure NTP on network clients (e.g., on client computing devices running NTP client software). NTP is a network protocol providing a time synchronization service. In order to perform time synchronization, an NTP client communicates with one or more NTP servers. The NTP servers (which can be called stratum time sources) can be organized into a hierarchical structure, with top-level NTP servers (the root of the hierarchy) designated as "stratum 0" time sources, the next level designated as "stratum 1" time sources, and so on. Typically, an NTP client maintains time synchronization by periodically communicating with a number of stratum time sources.

NTP can benefit from consistent and reliable network communication. For example, time synchronization performance using NTP can benefit when the NTP client and the NTP servers are in close network proximity (e.g., when the network latency between the NTP client and the NTP servers is low). In addition, preferring NTP servers that are in close network proximity can reduce network traffic in other parts of the network (e.g., by reducing the need to communicate with NTP servers that may be far away in terms of network latency, topology, etc.).

Clusters

In the technologies described herein, a cluster refers to a group of hosts (e.g., computing devices of various types, such as web servers, database servers, networking equipment, etc.) that are located in a particular geographical area. For example, a cluster may refer to a group of hosts located in a data center in a particular city (e.g., a group of hosts located in a data center at, or near, Los Angeles can be called the Los Angeles cluster).

In some implementations, a network service is available from a number of clusters. For example, a business or organization may operate hosts in a number of different clusters (e.g., a San Francisco cluster, a Los Angeles cluster, a London cluster, etc.). Computing devices (e.g., servers) that provide a network service (e.g., the NTP service or another network service) can be located in one or more of the different clusters of the business or organization. For example, the San Francisco cluster may contain three NTP servers (three network time sources), the Los Angeles cluster may contain five NTP servers, and the London cluster may not contain any NTP servers. NTP servers may also be available from sources other than the clusters of the business or organization (e.g., provided by different network providers or different businesses, in different geographical areas, etc.).

In some implementations, computing devices that provide a network service are organized in different ways. For example, computing devices can be organized by geographical region (e.g., a city, state, country, continent, etc.). For example, computing devices providing NTP service can be grouped into regions including a North America region, a Europe region, an Asia region, etc. In some implementations, combinations of grouping (e.g., cluster and region) can be used.

Network Fabrics

In the technologies described herein, a network fabric refers to a segment of a network. For example, a network can be physically segmented (e.g., with different segments having different physical network connections and network devices) and/or logically segmented (e.g., using different network addresses, routing, etc.).

Different network fabrics can be used for different purposes. For example, a business or organization may implement a first network fabric hosting computing devices that provide services to the public (e.g., web servers connected to the Internet) and a second network fabric providing internal services (e.g., a private network providing internal services for a company).

Multiple network fabrics can exist within a cluster and a network fabric can span clusters or regions. For example, a particular cluster may contain hosts organized into multiple network fabrics (e.g., one or more fabrics providing externally-facing services of a company and/or one or more fabrics providing internally-facing services of the company).

In some implementations, instead of organizing computing devices by network fabric, computing devices can be organized by class. A class can refer to a service type. For example, computing devices can be organized into service types comprising government, university, and public. Network services can then be provided according to the class (e.g., a host running a client of a network service that is associated with the government class can prefer network service providers that are also associated with the government class). Classes can also span regions or clusters. For example, computing devices associated with the government class can be located in different regions (e.g., different cities, states, etc.). In some implementations, a host that is associated with a particular class uses servers only from the particular class (e.g., a host running a client of a network service that is associated with a government class could use only network service providers that are also associated with the government class).

Environments for Automatically Configuring Network Services

In any of the implementations described herein, automatic configuration of network service clients can be performed within environments where hosts are located in different regions and/or clusters, or are associated with different classes and/or network fabrics. For example, a network environment can be maintained by a business or organization that includes computing devices located in different data centers in different geographical areas. The environment can include various types of packet-switched networks (e.g., public and/or private packet-switched networks, the Internet, etc.).

FIG. 1 is a diagram of an example environment 100 within which automatic configuration of network service clients can be performed. The environment 100 depicts three clusters, cluster 1 (110), cluster 2 (120), and cluster 3 (130). For example, each cluster can represent the hosts that are located in a different geographical location (e.g., located in a different data center in a different city). For example, cluster 1 (110) can be a cluster of hosts at a first location (e.g., at or near Los Angeles), cluster 2 (120) can be a cluster of hosts at a second location (e.g., at or near San Francisco), and cluster 3 (130) can be a cluster of hosts at a third location (e.g., at or near Seattle). The clusters can communicate with each other via network connections. For example, the clusters (110, 120, and 130) are connected to a network 170 (e.g., the Internet) via which the clusters can communicate with one another. In some implementations, other network connections may be present (e.g., in addition to, or instead of, the network 170). For example, network connections may exist between clusters and/or between network fabrics within clusters (e.g., direct network connections, such as private network connections, may exist between the different network fabrics, such as between the different network fabric 3 cluster locations 160A, 160B, and 160C).

In the environment 100, the hosts located at a particular cluster are segmented into different network fabrics, and the network fabrics span clusters. Specifically in the example environment 100, there are three network fabrics, network fabric 1 (140A, 140B, and 140C), network fabric 2 (150A, 150B, and 150C), and network fabric 3 (160A, 160B, and 160C). Each of the network fabrics spans the three clusters. For example, the portion of network fabric 1 located in cluster 1 (110) is depicted as 140A, the portion of network fabric 1 located in cluster 2 (120) is depicted as 140B, and the portion of network fabric 1 located in cluster 3 (130) is depicted as 140C.

The different network fabrics can comprise hosts that perform different tasks or provide different services. For example, network fabric 1 can comprise hosts that provide cloud computing services to customers of a business. Network fabric 2 can comprise hosts that provide data storage services to customers of the business. Network fabric 3 can comprise hosts that provide internal services (e.g., email, database, storage, etc.) to the business.

In the example environment 100, the NTP service is being provided. Specifically, time sources (e.g., computing devices running NTP server software, which can be called stratum time sources) are provided in different clusters and in different network fabrics. For example, network fabric 1 (140A) in cluster 1 (110) contains one or more time sources. However, there may be situations where not all clusters or network fabrics contain a time source. For example, network fabric 3 (160A) in cluster 1 (110) does not contain any time sources.

The hosts within the example environment 100 can be automatically configured to use time sources that are close (e.g., in terms of network latency, cluster, network fabric, and/or based on other criteria). For example, a particular host in cluster 1 (110) and network fabric 1 (140A) can automatically obtain a number of time sources to use to configure an NTP client running on the particular host by obtaining a list of which clusters contain network time sources located in network fabric 1. In the example environment 100, such a list would include cluster 1 (110), cluster 2 (120), and cluster 3 (130) because all three clusters contain time sources in network fabric 1. In contrast, a host in network fabric 3 would obtain a list that only indicates cluster 3 as having time sources in network fabric 3.

Once a host obtains a list of the clusters containing time sources for the network fabric in which the host is located, the host can select the time sources that it will use to configure its NTP client. In some implementations, the host selects time sources from its own cluster first, if available. For example, a host located in cluster 1 (110) and network fabric 1 (140A) would first select time sources from cluster 1 (110) and network fabric 1 (140A). If additional time sources are needed, the host can determine the closest other cluster in terms of network latency (e.g., by pinging a time source from each of the other clusters) and select time sources from that cluster. If yet additional time sources are needed, the host can move to the next cluster in order from lowest latency to highest latency until the desired number of time sources have been obtained (e.g., a pre-determined number of time sources).

In some implementations, automatic configuration of NTP clients is accomplished with the use of a DNS service 180. For example, hosts can obtain the list of which clusters contain time sources for their network fabric from the DNS server 180. In some implementations, the DNS server 180 maintains a list for each network fabric indicating which clusters of the network fabric contain time sources. For example, the DNS server 180 can maintain a list for network fabric 1 indicating time sources are available in cluster 1 (110), cluster 2 (120), and cluster 3 (130), a list for network fabric 2 indicating time sources are available in cluster 1 (110), cluster 2 (120), and cluster 3 (130), and a list for network fabric 3 indicating time sources are available cluster 3 (130). The DNS service 180 can also maintain internet address records for the available time sources. For example, if a host in network fabric 1 (140A) in cluster 1 (110) is obtaining time sources from cluster 1 (110), the host can query the DNS service 180 to obtain internet addresses of the time sources available in network fabric 1 (140A) (e.g., round-robin DNS records can be maintained by the DNS service 180). In some implementations, standard DNS servers are utilized to provide the text and/or round-robin records (e.g., no custom DNS software is needed).

In the example environment 100, the DNS service 180 is depicted as a separate entity from the clusters for ease of illustration. However, the DNS service 180 is a distributed service, and DNS servers can exist at various places within the environment (e.g., within the clusters, within the network fabrics, within the network 170, and/or in other network locations).

In the example environment 100, three clusters and three network fabrics are depicted. However, any number of clusters and/or network fabrics may be supported. In addition, the three depicted network fabrics each span the three clusters. However, a given network fabric may be located only within a particular cluster or may span fewer than all available clusters.

Figure 2:
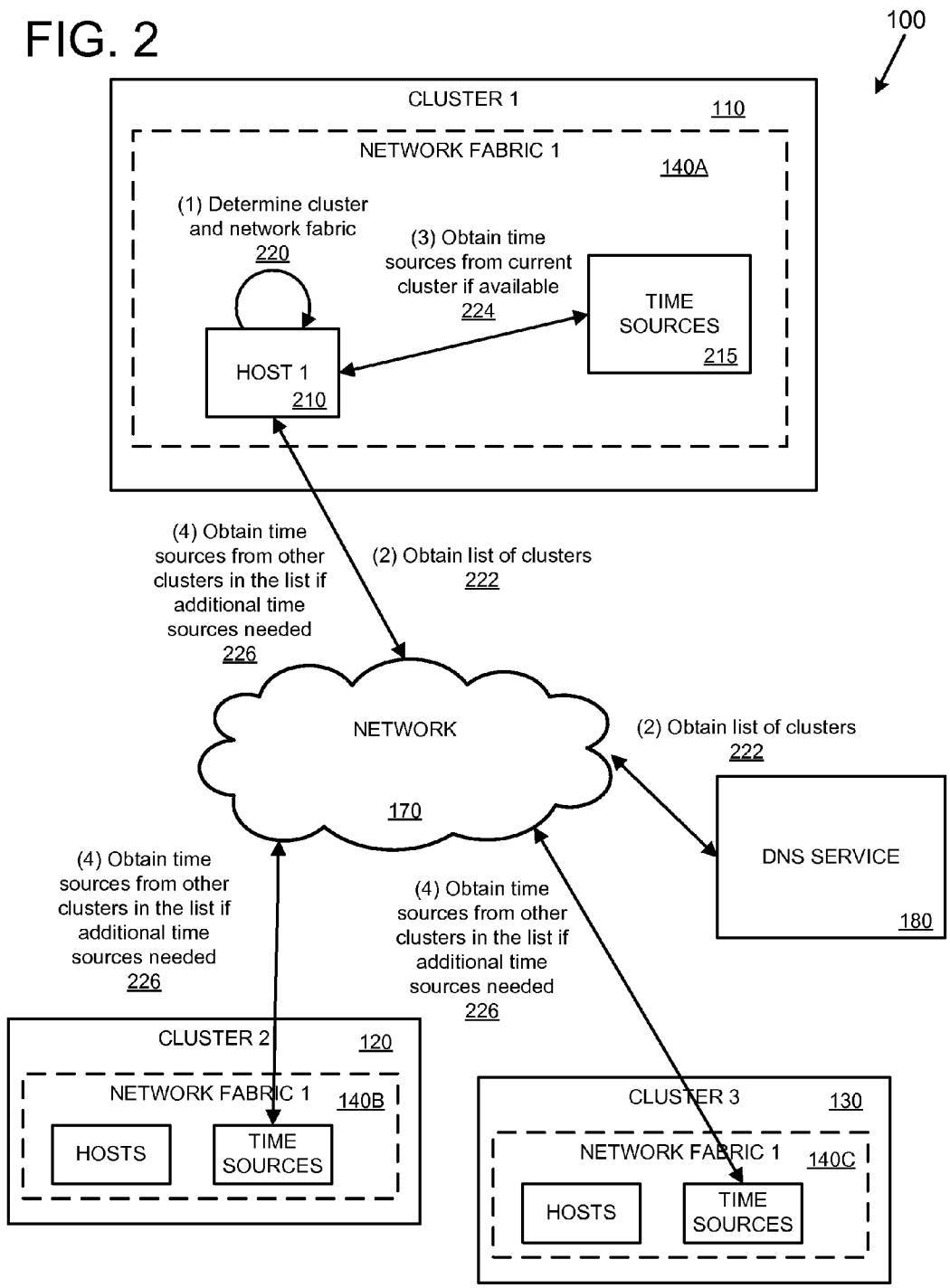
FIG. 2 is a diagram of an example environment depicting automatic configuration of an NTP client running on a host computing device.

FIG. 2 is a diagram of the example environment 100 in which configuration of an NTP client running on a host computing device is illustrated. Specifically, host 1 (210) is depicted, which is located in cluster 1 (110) and in network fabric 1 (140A). In order to configure its NTP client, host 1 (210) determines the cluster and network fabric where host 1 (210) is located, as depicted at 220. Next, host 1 (210) obtains a list of clusters that are associated with network fabric 1 from the DNS service 180, as depicted at 222. The list of clusters indicates which clusters contain time sources. In this example, the list of clusters that contain time sources for fabric 1 includes cluster 1 (110), cluster 2 (120), and cluster 3 (130). Because the list includes cluster 1 (110) (the current cluster in which host 1 (210) is located), host 1 (210) first obtains time sources 215 located in cluster 1 (110), as depicted at 224.

If there are enough time sources available in cluster 1 (110), then host 1 (210) does not need to obtain time sources from any other clusters. For example, if host 1 (210) needs a pre-determined number of time sources (e.g., four time sources), and the pre-determined number of time sources (or more) are available in the current cluster, then host 1 (210) can use just the pre-determined number of time sources from the current cluster to configure the NTP client.

However, if there are not enough time sources available in cluster 1 (110), then host 1 (210) obtains time sources from other clusters in the list, as depicted in 226. In some implementations, host 1 (210) determines the network latency to each of the other clusters. For example, host 1 (210) can ping one host (e.g., one time source) from each of the other clusters. Host 1 (210) can then obtain additional time sources from the other cluster with the lowest latency. For example, if cluster 2 (120) has the lowest latency (between clusters 2 and 3), then host 1 (210) can obtain time sources from cluster 2 (120). If cluster 2 (120) provides enough additional time sources (e.g., to meet the pre-determined number), then host 1 (210) can stop and configure the NTP client. However, if yet more time sources are needed, host 1 (210) can obtain time sources from other clusters in order from lowest latency to highest latency (e.g., from cluster 3 (130) next).

Figure 3:
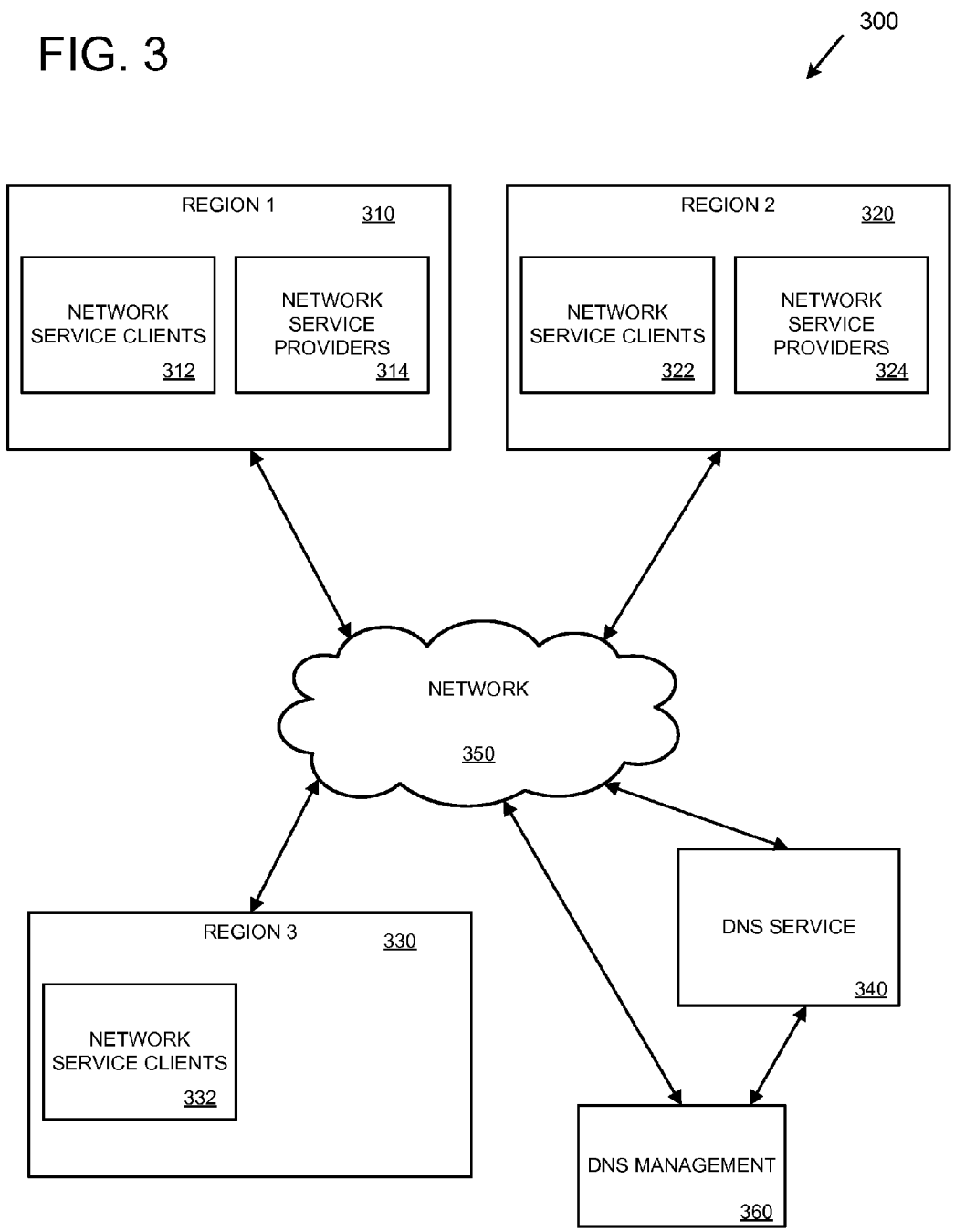
FIG. 3 is a diagram of an example environment supporting automatic configuration of network service clients organized by region.

FIG. 3 is a diagram of an example environment 300 within which automatic configuration of network service clients can be performed. The environment 100 depicts three regions, region 1 (310), region 2 (320), and region 3 (330). Each region represents a different geographical area, such as a different city, state, country, continent, etc. For example, each region could represent a cluster (e.g., a group of hosts in a particular data center) or another type of geographical area (e.g., a state or country).

Each region can comprise a number of network service clients (e.g., hosts that run clients of the network service, such as NTP clients) and a number of network service providers (e.g., hosts that run server software and/or hardware providing the network service, such as NTP servers). For example, region 1 (310) comprises a number of network service clients 312 and a number of network service providers 314, and region 2 (320) also comprises a number of network service clients 322 and a number of network service providers 324. However, there may be some regions that do not contain any network service clients and/or network service providers. For example, region 3 (330) contains network service clients 332 but does not contain any network service providers.

The example environment 300 includes a network 350, which can be used for communication between the regions and/or with other computing devices reachable via the network 350 (e.g., reachable via the Internet). In some implementations, other network connections may exist (e.g., direct or private network connections between regions and/or from regions to other networks).

The example environment 300 supports automatic configuration of network services (e.g., automatic configuration of client software running on the network service clients). For example, network service clients can be configured to use network service providers that are in close network proximity (e.g., preferring network service providers from the same region and/or from other regions with the lowest network latency).

The example environment 300 includes a DNS service 340. The DNS service 340 can be used in automatically configuring network service clients. The DNS service 340 can maintain a list of which regions contain network service providers. For example, the DNS service 340 can maintain a list on a per-service basis (e.g., indicating that network service providers for a first network service are available in particular regions, indicating that network service providers for a second network service are available in particular regions, and so on). For example, one of the network service clients 312 in region 1 (310) can query the DNS service 340 to obtain a list of regions that include network service providers for a particular network service. Using the list, the network service client can configure itself (e.g., by performing software configuration and/or hardware configuration). For example, the network service client can use network service providers from the same region (e.g., network service providers 314) if available, and then from other regions (e.g., network service providers 324) if additional network service providers are needed (e.g., in order from the lowest latency region of the other regions).

In some implementations, the example environment 300 also includes a DNS management component 360. The DNS management component 360 can be used to configure DNS properties of the example environment 300 (e.g., to maintain up-to-date DNS information for use in configuring the network services). For example, the DNS management component 360 can provide a management interface for configuring information provided by the DNS service 340 (e.g., for configuring DNS text records indicating which regions, clusters, and/or network fabrics contain network service providers for particular network services, for configuring DNS round-robin records indicating network addresses for network service providers for particular regions, clusters, and/or network fabrics, etc.). The DNS management component 360 can also be used to monitor health information of service provider hosts (e.g., to make sure a host is healthy before advertising the host as an available service provider in a DNS record).

In the example environment 300, the DNS service 340 is depicted as a separate entity from the regions for ease of illustration. However, the DNS service 340 is a distributed service, and DNS servers can exist at various places within the environment (e.g., within the regions, within the network 350, and/or in other network locations). Similarly, the DNS management component 360 can exist at various places within the environment (e.g., at a centralized location, such as within one of the regions or at an external location as depicted, or as a distributed service).

In the example environment 300, network service clients and network service providers are depicted as organized by region. However, in some implementations, additional levels of organization can be provided. For example, the network service clients and network service providers can be organized by network fabric within each region and/or based on other levels of organization (e.g., based on a hierarchy of locations, such as by country, by state, and by city). In the example environment 300, three regions are depicted. However, any number of regions may be supported.

In some implementations, automatic client-side configuration of network services can be performed for hosts that are associated with a business or organization (e.g., hosts that are located on networks operated by the business or organization). For example, a business may maintain hosts at various locations (e.g., regions or clusters) and/or on various types of networks (e.g., on various network fabrics). The technologies described herein can be applied to configure clients of network services running on the hosts of the business or organization (e.g., using DNS services operated by the business or organization). While the hosts may be operated by the business or organization, the hosts can still provide services that are internal to the business or organization and/or services that are external (e.g., to customers via the Internet). For example, with reference to FIG. 3, the regions (310, 320, and 330) can be regions of networks and associated hosts (network service clients and providers, etc.) that are operated by a business where the regions may be connected via private networks (not depicted) and/or by public networks (e.g., network 350, such as the Internet).

In some implementations, automatic client-side configuration of network services can be performed for hosts that are not associated with a particular business or organization. For example, a public network service that is utilized by hosts running on the Internet (e.g., hosts operated by individuals, companies, government agencies, etc.) can utilize the technologies described herein. For example, hosts running NTP client software can be configured (e.g., via custom NTP client software) to use NTP servers using the described techniques (e.g., obtaining NTP servers in close network proximity by various criteria such as country or continent, by class, etc.). For example, with reference to FIG. 3, the regions (310, 320, and 330) can be regions of networks and associated hosts (network service clients and providers, etc.) on a public network such as the Internet. For example, the regions can represent different states, countries, or continents. In other implementations, a combination of public network and private network techniques can be used.

Methods for Performing Automatic Network Service Client-Side Configuration

In any of the technologies described herein, methods can be provided for performing automatic network service client-side configuration (e.g., NTP client-side configuration). For example, hosts can determine their location, obtain lists of network service providers, and perform configuration operations based on the list (e.g., preferring network service providers that are in close network proximity from the same location and/or from other locations). DNS services can be used in the configuration operations (e.g., providing records indicating the list of locations that include network service providers based on various criteria, providing network addresses of network service providers, and/or providing other information).

Figure 4:
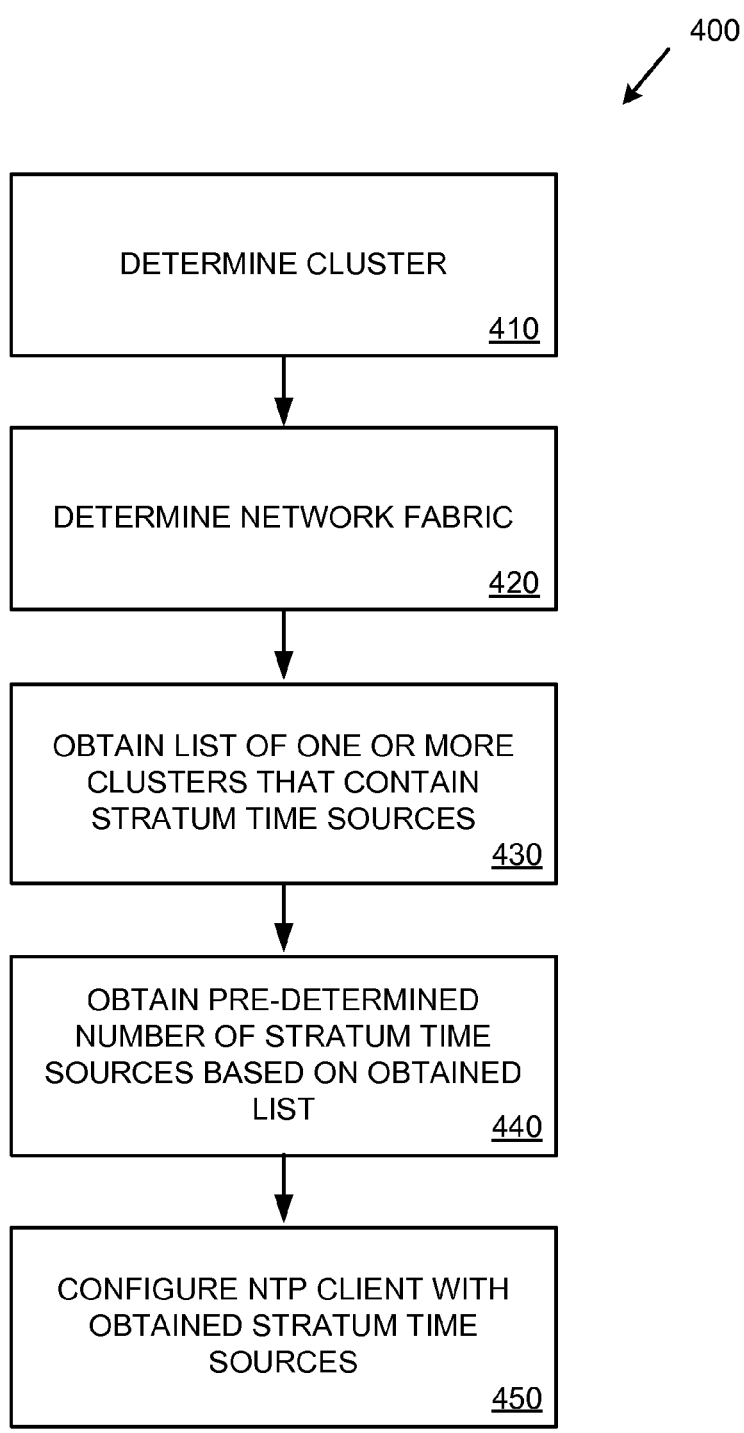
FIG. 4 is a flowchart of an example method for performing automatic NTP client-side configuration.

FIG. 4 is a flow chart of an example method 400 for performing automatic NTP client-side configuration. For example, the example method 400 can be performed by a computing device such as one of the hosts depicted in FIG. 1 or 2 (e.g., by host 210 depicted in FIG. 2).

At 410, a cluster where the computing device is located is determined. The cluster can represent a collection of computing devices at a given geographical location. For example, the computing device could be located in a particular data center near a particular city.

At 420, a network fabric associated with the computing device is determined. The network fabric can represent a network segment where the computing device is connected. For example, the network fabric can be a public network fabric of a business that provides a service to customers via the Internet. The network fabric can also be a private network fabric of a business that provides internal services for the business.

At 430, a list of one or more clusters is obtained where each of the one or more clusters contains at least one stratum time source. For example, stratum time sources may be distributed across different clusters operated by a business (e.g., some clusters may contain multiple stratum time sources and some clusters may not contain any stratum time sources). Those clusters that contain at least one stratum time source can be included in the list. The list of one or more clusters can be specific to the network fabric associated with the computing device (e.g., a separate list of clusters can be maintained for each of a plurality of network fabrics). In some implementations, the list of one or more clusters is obtained via a DNS text record associated with the network fabric (e.g., the computing device can be configured with a DNS text record template that, when the current network fabric is incorporated, returns the list from the DNS service).

At 440, a pre-determined number of stratum time sources are obtained (e.g., four stratum time sources in some implementations) based on the list obtained at 430. In some implementations, the pre-determined number of stratum time sources are obtained first from the cluster where the computing device is located (as determined at 410) and then, if needed, from additional clusters in order of lowest latency. For example, when the cluster where the computing device is located is one of the one or more clusters in the list, the pre-determined number of stratum time sources can be obtained first from the cluster where the computing device is located, and if the pre-determined number of stratum time sources is not available from the cluster, then from other clusters of the one or more clusters in order of lowest latency to highest latency. Otherwise, when the cluster where the computing device is located is not one of the one or more clusters in the list, the pre-determined number of stratum time sources can be obtained from the one or more clusters in order from a lowest latency cluster, of the one or more clusters, to a highest latency cluster, of the one or more clusters. Latency to a particular cluster can be determined, for example, by pinging one of the stratum time sources in the particular cluster.

At 450, the NTP client of the computing device is configured with the stratum time sources obtained at 440. For example, network addresses can be retrieved for the stratum time sources and the NTP client can be configured to use those network addresses. The computing device can obtain network addresses (e.g., IP addresses) of stratum time sources using the DNS service (e.g., the DNS service can maintain round-robin DNS records for the stratum time sources).

Figure 5:
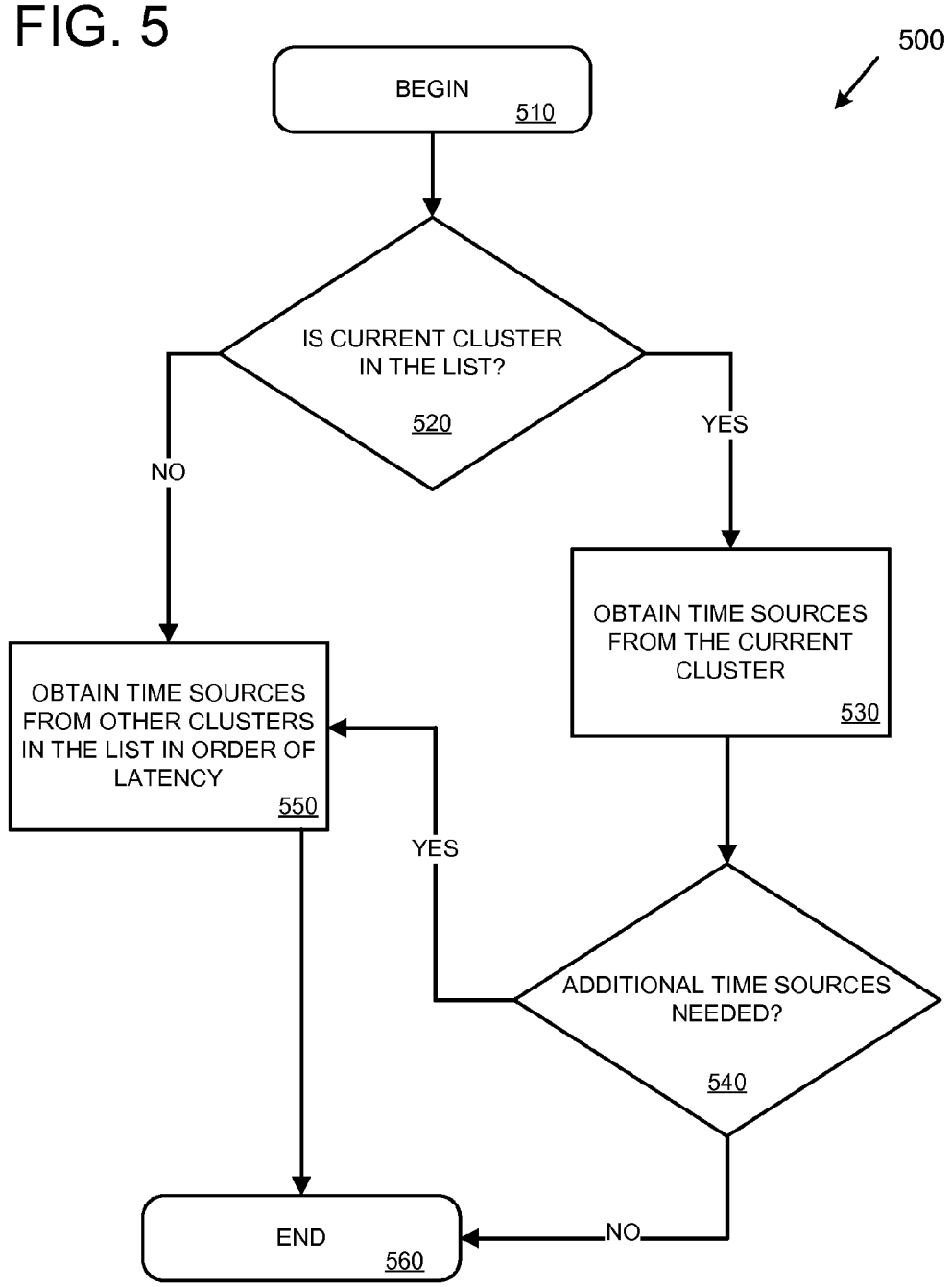
FIG. 5 is a flowchart of an example method for obtaining stratum time sources.

FIG. 5 is a flow chart of an example method 500 for obtaining a pre-determined number of stratum time sources (e.g., four stratum time sources in some implementations). The example method 500 represents one way of implementing element 440 in FIG. 4.

Once a list of clusters that contain stratum time sources is obtained (e.g., as described above with regard to element 440 in FIG. 4), the method begins at 510. At 520, the obtained list of stratum time sources is examined to determine whether the current cluster where the computing device is located is in the list. If the current cluster is not in the list, the method proceeds to 550 where a number (e.g., a predetermined number, which is four in some implementations) of stratum time sources are obtained from the clusters in the list in order of latency. For example, the computing device can determine its latency to each of the other clusters in the list (e.g., by pinging a stratum time source, or another computing device, in each cluster). The computing device can determine which cluster is closest (has the lowest latency) and/or order the clusters from lowest latency to highest latency. The computing device can then obtain stratum time sources from the cluster with the lowest latency first and, if additional stratum time sources are needed to reach the number desired (e.g., the pre-determined number), from other clusters in order of latency. Once the stratum time sources have been obtained, the method proceeds to 560 and ends (e.g., the obtained stratum time sources can be configured as described above with regard to 450).

If the current cluster is in the list (as determined at 520), the method proceeds to 530 where stratum time sources are obtained from the current cluster. For example, a pre-determined number of stratum time sources can be obtained from the current cluster, if available. At 540, the computing device checks whether additional time sources are needed. For example, if the pre-determined number of stratum time sources is four, and the current cluster only contains two, then additional time sources are needed. If additional stratum time sources are needed, the method proceeds to 550, where the additional time sources are obtained from other clusters in the list (clusters other than the current cluster where the computing device is located), as described above with regard to 550. If additional time sources are not needed, the method proceeds to 560 and ends (e.g., the obtained stratum time sources can be configured as described above with regard to 450).

Figure 6:
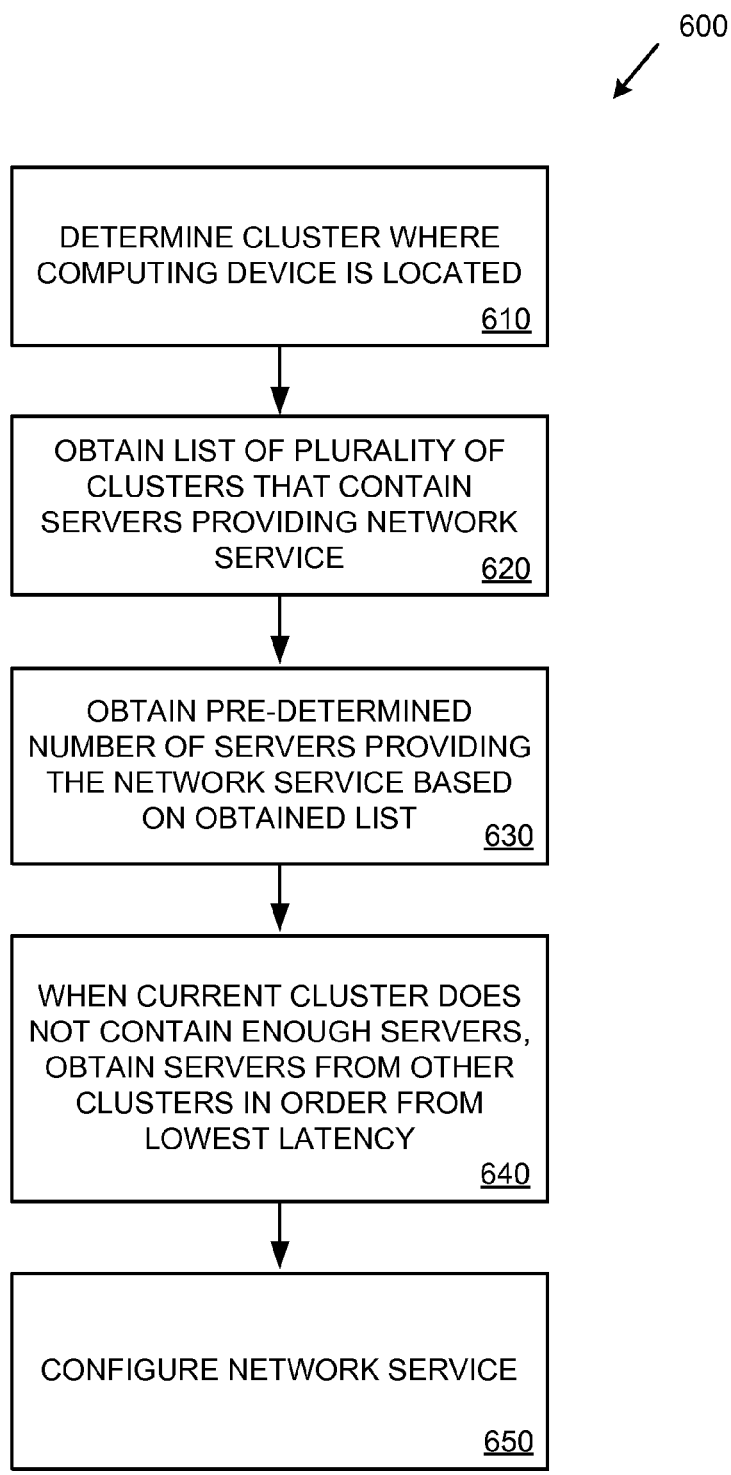
FIG. 6 is a flowchart of an example method for performing automatic client-side configuration of a network service based, at least in part, upon clusters.

FIG. 6 is a flow chart of an example method 600 for performing automatic client-side configuration of a network service (e.g., the NTP service or another network service) based, at least in part, upon clusters. At 610, a cluster is where the computing device is located is determined. The cluster can represent a collection of computing devices at a given geographical locations. For example, the computing device could be located in a particular data center near a particular city.

At 620, a list of a plurality of clusters is obtained where each of the plurality of clusters contains at least server providing the network service (e.g., at least one network service provider). For example, servers providing a network service may be distributed across different clusters operated by a business (e.g., some clusters may contain multiple servers providing the network service and some clusters may not contain any servers). Those clusters that contain at least one server providing the network service can be included in the list.

At 630, a pre-determined number of servers providing the network service are obtained based on the list obtained at 620. In some implementations, the pre-determined number of servers are obtained first from the cluster where the computing device is located (as determined at 610) and then, if needed, from additional clusters in order of lowest latency.

At 640, when the current cluster where the computing device is located (as determined at 610) does not contain enough servers (e.g., when there are fewer than a pre-determined number of servers in the current cluster), then additional servers providing the service are obtained from other clusters in the list in order from lowest latency to highest latency. Latency to a particular cluster can be determined, for example, by pinging one of the servers in the particular cluster.

At 650, the network service client is configured at the computing device based on the pre-determined number of network servers obtained at 630 and 640.

Example Implementation for NTP Client-Side Configuration

This section provides an example implementation for automatic NTP client-side configuration. While the description in this section is NTP specific, the techniques can be applied when configuring other network services and/or combined with other techniques described herein. In the example implementation, hosts are organized by cluster and network fabric (e.g., as depicted in FIG. 1), and the pre-determined number of stratum time sources used to configure the NTP client is four. In addition, clusters are identified by a three-letter code related to the city where the cluster is located (or nearest to the cluster). For example, a cluster for a data center near San Francisco can be labeled the "SFO" cluster, a cluster for a data center near Seattle can be labeled the "SEA" cluster, and so on.

A host that is configuring the NTP service first determines the cluster where it is located and the network fabric of which it is a part. Then, the hosts obtain a DNS text record (which is fabric-specific) indicating which clusters contain stratum time sources for the network fabric. In the example implementation, the host obtains the DNS text record using a template where the network fabric is incorporated. As a simplified example, the template may be "<fabric>.company.com" into which the host inserts the fabric to generate "fabric1.company.com" from which the host queries the DNS service to obtain the associated DNS text record listing the clusters.

Once the host has obtained the list of clusters where stratum time sources are located (e.g., a list of three-letter cluster codes), the host first checks to see if the current cluster where the host is located is in the list (indicating that the current cluster contain stratum time sources). If the current cluster is in the list, the host tries to obtain four stratum time sources located in the current cluster. To do this, the host queries DNS round-robin records for the current cluster to retrieve the IP addresses of all the stratum time sources in the current cluster (e.g., queries "ntp.rr.cluster1.company.com" for example). If there are more than four IP addresses (i.e., more than four stratum time sources) in the current cluster, then the host selects four at random and configures its NTP client. If there is less than four, the host uses as many as available.

If the host needs to obtain additional stratum time sources, either because the current cluster is not in the list or because the current cluster did not contain enough stratum time sources, the host determines which other cluster in the list has the lowest latency by pinging a stratum time source from each of the other clusters. The host then tries to obtain any remaining stratum time sources form the other cluster with the lowest latency (e.g., queries "ntp.rr.cluster2.company.com"). For example, if the host has two stratum time sources from its current cluster and there are six stratum time sources available in the next cluster with the lowest latency, the host selects two stratum time sources at random from the next cluster. If the host then has four stratum time sources, the host stops and configures its NTP client. Otherwise, the host moves on to the next cluster in order of lowest latency to highest latency.

In order to maintain an up-to-date NTP client-side configuration, hosts can perform automatic configuration on a periodic basis. For example, a host can perform NTP client-side configuration on a daily basis or based on some other schedule. Performing configuration on a period basis can help ensure that changes to the network service (e.g., changes to stratum time sources, list of clusters where stratum time sources are available, etc.) are incorporated by NTP clients.

Example Service Provider Environments

Figure 7:
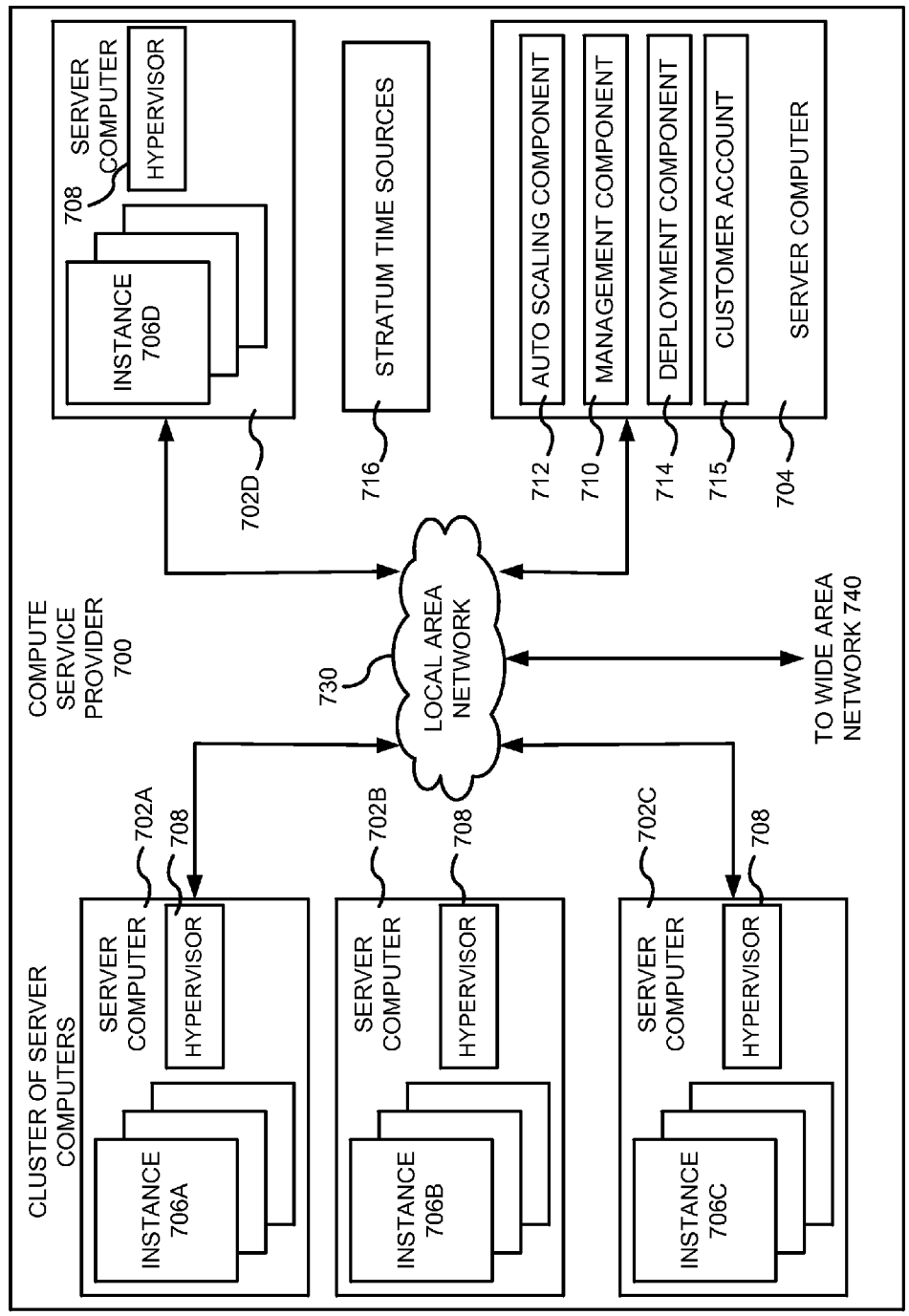
FIG. 7 is an example system diagram showing a plurality of virtual machine instances running in the multi-tenant environment.

FIG. 7 is a computing system diagram of a network-based compute service provider 700 that illustrates one environment in which embodiments described herein can be used. By way of background, the compute service provider 700 (i.e., the cloud provider) is capable of delivery of computing and storage capacity as a service to a community of end recipients. In an example embodiment, the compute service provider can be established for an organization by or on behalf of the organization. That is, the compute service provider 700 may offer a "private cloud environment." In another embodiment, the compute service provider 700 supports a multi-tenant environment, wherein a plurality of customers operate independently (i.e., a public cloud environment). Generally speaking, the compute service provider 700 can provide the following models: Infrastructure as a Service ("IaaS"), Platform as a Service ("PaaS"), and/or Software as a Service ("SaaS"). Other models can be provided. For the IaaS model, the compute service provider 700 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 700 using networked client devices, such as desktop computers, laptops, tablets, smartphones, etc. running web browsers or other lightweight client applications. Those skilled in the art will recognize that the compute service provider 700 can be described as a "cloud" environment.

The particular illustrated compute service provider 700 includes a plurality of server computers 702A-702D. While only four server computers are shown, any number can be used, and large centers can include thousands of server computers. The server computers 702A-702D can provide computing resources for executing software instances 706A-706D. In one embodiment, the instances 706A-706D are virtual machines. As known in the art, a virtual machine is an instance of a software implementation of a machine (i.e. a computer) that executes applications like a physical machine. In the example, each of the servers 702A-702D can be configured to execute a hypervisor 708 or another type of program configured to enable the execution of multiple instances 706 on a single server. For example, each of the servers 702A-702D can be configured (e.g., via the hypervisor 708) to support one or more virtual machine slots, with each virtual machine slot capable of running a virtual machine instance (e.g., server computer 702A could be configured to support three virtual machine slots each running a corresponding virtual machine instance). Additionally, each of the instances 706 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 704 can be reserved for executing software components for managing the operation of the server computers 702 and the instances 706. For example, the server computer 704 can execute a management component 710. A customer can access the management component 710 to configure various aspects of the operation of the instances 706 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 712 can scale the instances 706 based upon rules defined by the customer. In one embodiment, the auto scaling component 712 allows a customer to specify scale-up rules for use in determining when new instances should be instantiated and scale-down rules for use in determining when existing instances should be terminated. The auto scaling component 712 can consist of a number of subcomponents executing on different server computers 702 or other computing devices. The auto scaling component 712 can monitor available computing resources over an internal management network and modify resources available based on need.

A deployment component 714 can be used to assist customers in the deployment of new instances 706 of computing resources. The deployment component can have access to account information associated with the instances, such as who is the owner of the account, credit card information, country of the owner, etc. The deployment component 714 can receive a configuration from a customer that includes data describing how new instances 706 should be configured. For example, the configuration can specify one or more applications to be installed in new instances 706, provide scripts and/or other types of code to be executed for configuring new instances 706, provide cache logic specifying how an application cache should be prepared, and other types of information. The deployment component 714 can utilize the customer-provided configuration and cache logic to configure, prime, and launch new instances 706. The configuration, cache logic, and other information may be specified by a customer using the management component 710 or by providing this information directly to the deployment component 714. The instance manager can be considered part of the deployment component.

Customer account information 715 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 730 can be utilized to interconnect the server computers 702A-702D and the server computer 704. The network 730 can be a local area network (LAN) and can be connected to a Wide Area Network (WAN) 740 so that end users can access the compute service provider 700. It should be appreciated that the network topology illustrated in FIG. 7 has been simplified and that many more networks and networking devices can be utilized to interconnect the various computing systems disclosed herein.

Automatic configuration of network service clients can be performed within the compute service provider 700. For example the server computers 702A-702D can run network service client software (e.g., NTP clients). The server computers 702A-702D can determine the current cluster where they are located and/or their network fabric. The server computers 702A-702D can obtain lists of clusters (e.g., fabric-specific lists) from a DNS service (not depicted) and, based on the list, configure their network services. Regarding automatic NTP client-side configuration, the server computers 702A-702D can obtain fabric-specific lists of clusters from the DNS service (not depicted). The server computers 702A-702D can obtain stratum time sources 716 from the current cluster first and if additional stratum time sources are needed from other clusters in the list (e.g., in order latency) via the wide area network 740.

Figure 8:
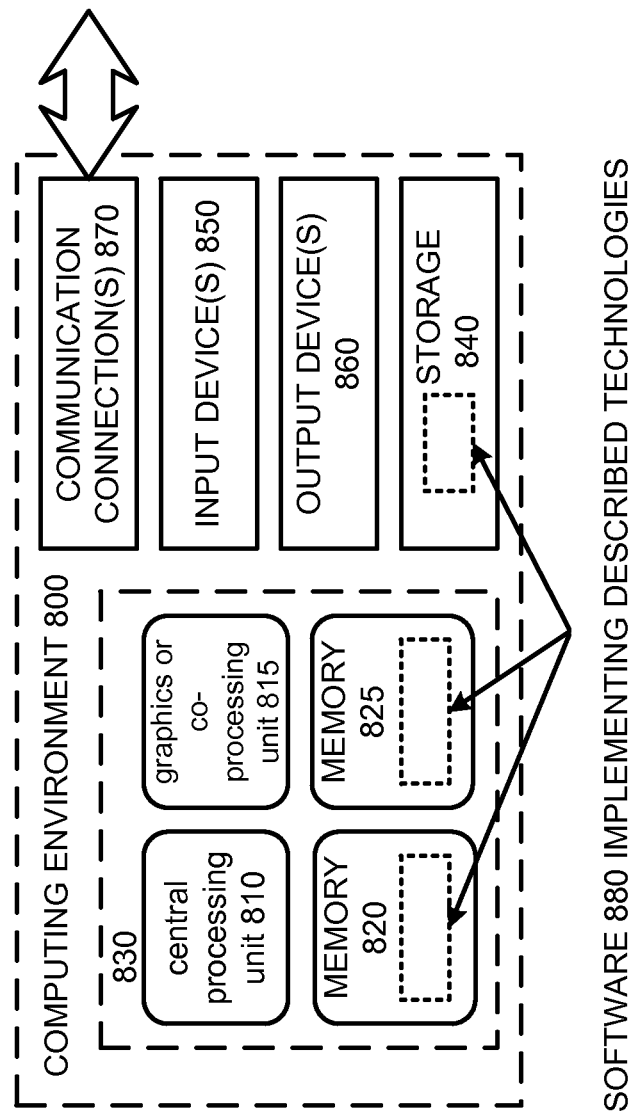
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method, implemented by a computing device, for performing automatic network time protocol (NTP) client-side configuration, the method comprising:
    determining a cluster where the computing device is located;
    determining a network fabric associated with the computing device;
    obtaining a list of one or more clusters, wherein the list is associated with the network fabric, and wherein each of the one or more clusters in the list contain at least one stratum time source;
    when the cluster where the computing device is located is one of the one or more clusters in the list, obtaining at least some of a pre-determined number of stratum time sources from the cluster where the computing device is located; and if the pre-determined number of stratum time sources is not available from the cluster where the computing device is located, obtaining any remaining of the pre-determined number of stratum time sources from other clusters of the one or more clusters in order of lowest latency to highest latency;
    when the cluster where the computing device is located is not one of the one or more clusters in the list, obtaining the pre-determined number of stratum time sources from the one or more clusters in order from a lowest latency cluster, of the one or more clusters, to a highest latency cluster, of the one or more clusters; and
    configuring an NTP client of the computing device with the obtained pre-determined number of stratum time sources.

2. The method of claim 1 wherein the list of one or more clusters is obtained via a domain name system (DNS) text record (TXT) associated with the network fabric.

3. The method of claim 1 wherein a given cluster represents a collection of computing devices at a given geographical location.

4. The method of claim 1 wherein the pre-determined number of stratum time sources is four stratum time sources.

5. The method of claim 1 wherein a list of one or more clusters is maintained for each of a plurality of network fabrics, including the list of one or more clusters associated with the network fabric.

6. The method of claim 1 wherein obtaining stratum time sources for a given cluster comprises:
    retrieving Internet protocol (IP) addresses for the stratum time sources from DNS records associated with the given cluster.

7. The method of claim 6 wherein the DNS records are round-robin (RR) DNS records.

8. A computing device comprising:
    one or more processing units; and
    a network interface;
    the computing device configured to performing operations for automatic network time protocol (NTP) client-side configuration, the operations comprising:
        determining a cluster where the computing device is located;
        obtaining a list of a plurality of clusters, wherein each cluster of the plurality of clusters in the list contains at least one stratum time source;
        obtaining a pre-determined number of stratum time sources using the list, comprising:
            when the cluster where the computing device is located contains less than the pre-determined number of stratum time sources:
                determining latency to one or more clusters of the plurality of clusters other than the cluster where the computing device is located; and
                obtaining any remaining stratum time sources, that could not be obtained from the cluster where the computing device is located, of the pre-determined number of stratum time sources from the one or more clusters of the plurality of clusters in order starting from lowest latency; and
            when the cluster where the computing device is located is not one of the plurality of clusters in the list, obtaining the pre-determined number of stratum time sources from the plurality of clusters in order starting from lowest latency; and
        configuring an NTP client of the computing device with the obtained pre-determined number of stratum time sources.

9. The computing device of claim 8 wherein the list of the plurality of clusters is obtained via a domain name system (DNS) text record (TXT).

10. The computing device of claim 8 wherein the determining latency to one or more clusters of the plurality of clusters comprises, for each cluster of the one or more clusters:
    determining latency from the computing device to a stratum time source located in the cluster.

11. The computing device of claim 8 wherein obtaining stratum time sources for a given cluster comprises:

retrieving internet protocol (IP) addresses for the stratum time sources from DNS records associated with the given cluster.

12. The computing device of claim 8 wherein the computing device performs the operations for automatic NTP client-side configuration on a scheduled basis.

13. The computing device of claim 12 wherein the scheduled basis is once per day.

14. The computing device of claim 8 wherein the operations further comprise:
   determining a network fabric associated with the computing device;
   wherein the list of the plurality of clusters is specific to the network fabric.

15. A computer-readable storage medium storing computer-executable instructions for causing a computing device to perform operations for automatic client-side configuration of a network service, the operations comprising:
   determining a region where the computing device is located;
   obtaining a list of a plurality of regions, wherein each region of the plurality of regions in the list contains at least one server providing the network service;
   obtaining a pre-determined number of servers providing the network service using the list, comprising:
      when the region where the computing device is located contains less than the pre-determined number of servers:
         determining latency to one or more regions of the plurality of regions other than the region where the computing device is located; and
         obtaining any remaining servers, that could not be obtained from the region where the computing device is located, of the pre-determined number of servers from the one or more regions of the plurality of regions in order starting from lowest latency; and
      when the region where the computing device is located is not one of the plurality of regions in the list, obtaining the pre-determined number of servers providing the network service from the plurality of regions in order starting from lowest latency; and
   configuring the network service of the computing device using, at least in part, the obtained pre-determined number of servers.

16. The computer-readable storage medium of claim 15, wherein the network service is one of a web service, an instant messaging service, and a network time protocol (NTP) service.

17. The computer-readable storage medium of claim 15, wherein the list of the plurality of regions is obtained via a domain name system (DNS) text record (TXT).

18. The computer-readable storage medium of claim 15, wherein obtaining servers for a given region comprises:
   retrieving internet protocol (IP) addresses for the servers from DNS records associated with the given region.

19. The computer-readable storage medium of claim 15 wherein the operations further comprise:
   determining a class associated with the computing device;
   wherein the list of the plurality of regions is associated with the class;
   wherein the pre-determined number of servers is obtained only from servers associated with the class; and
   wherein a list of regions is maintained for each of a plurality of classes, including the list of the plurality of regions associated with the class.

* * * * *